United States Patent
Lopez

(10) Patent No.: US 10,130,212 B2
(45) Date of Patent: Nov. 20, 2018

(54) ADJUSTABLE HEIGHT GRILLING GRATE ASSEMBLY

(71) Applicant: Charles Lopez, Lincoln, CA (US)

(72) Inventor: Charles Lopez, Lincoln, CA (US)

( * ) Notice: Subject to any disclaimer, the term of this patent is extended or adjusted under 35 U.S.C. 154(b) by 64 days.

(21) Appl. No.: 15/260,585

(22) Filed: Sep. 9, 2016

(65) Prior Publication Data

US 2018/0070769 A1    Mar. 15, 2018

(51) Int. Cl.
*A47J 37/07* (2006.01)

(52) U.S. Cl.
CPC .... *A47J 37/0704* (2013.01); *A47J 2037/0795* (2013.01)

(58) Field of Classification Search
CPC .................................................. A47J 37/0704
USPC .......................................... 248/56, 247, 300
See application file for complete search history.

(56) References Cited

U.S. PATENT DOCUMENTS

| | | | | |
|---|---|---|---|---|
| 2,691,368 A | * | 10/1954 | Hood | A47J 37/04 110/195 |
| 3,152,536 A | * | 10/1964 | Lucas | A47J 37/0763 126/30 |
| 4,541,406 A | * | 9/1985 | DaSambiagio | A47J 37/0763 126/25 A |
| 4,867,130 A | | 9/1989 | Walker | |
| 5,931,085 A | * | 8/1999 | Benzschawel | A47J 37/0763 126/25 A |
| 6,845,705 B1 | | 1/2005 | Chen | |
| D563,144 S | | 3/2008 | Melzer et al. | |
| 2011/0283989 A1 | | 11/2011 | Ikeda | |
| 2015/0075514 A1 | | 3/2015 | Kuenzinger | |
| 2015/0245740 A1 | | 9/2015 | Garcia | |

FOREIGN PATENT DOCUMENTS

WO    WO2013113085    8/2013

* cited by examiner

*Primary Examiner* — Avinash Savani
*Assistant Examiner* — Rabeeul Zuberi

(57) ABSTRACT

An adjustable height grilling grate assembly includes a grate having a perimeter edge. A lift is attached to the grate for lifting or lowering the grate. The lift comprises a pair of vertical supports and a spindle is rotatably attached to and extends between each of the vertical supports. A pair of cables is attached to the spindle and are wound onto the spindle when the spindle is rotated in a first direction and unwound from the spindle when the spindle is rotated in a second direction. Each of the cables terminates with a connector and the connectors are attached to the grate. A pair of couplers is provided and each the vertical supports has one of the couplers slidably mounted thereto. The couplers engage the perimeter edge of the grate to retain the grate in a horizontal orientation when the vertical supports are in a vertical orientation.

1 Claim, 4 Drawing Sheets

ADJUSTABLE HEIGHT GRILLING GRATE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to grate height adjustment devices and more particularly pertains to a new grate height adjustment device for adjusting the height of a cooking grate relative to a heat source positioned below the cooking grate.

BRIEF SUMMARY OF THE INVENTION

An embodiment of the disclosure meets the needs presented above by generally comprising a grate having a perimeter edge. A lift is attached to the grate and is configured to lift or lower the grate. The lift comprises a pair of vertical supports each having a bottom end and a top end. A spindle is attached to and extends between each of the vertical supports. The spindle is rotatable with respect to the vertical supports. A pair of cables is attached to and extend downwardly from the spindle. The cables are wound onto the spindle when the spindle is rotated in a first direction and unwound from the spindle when the spindle is rotated in a second direction. Each of the cables terminates with a connector and the connectors are attached to the grate. A pair of couplers is provided and each the vertical supports has one of the couplers slidably mounted thereto. The couplers engage the perimeter edge of the grate to retain the grate in a horizontal orientation when the vertical supports are in a vertical orientation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
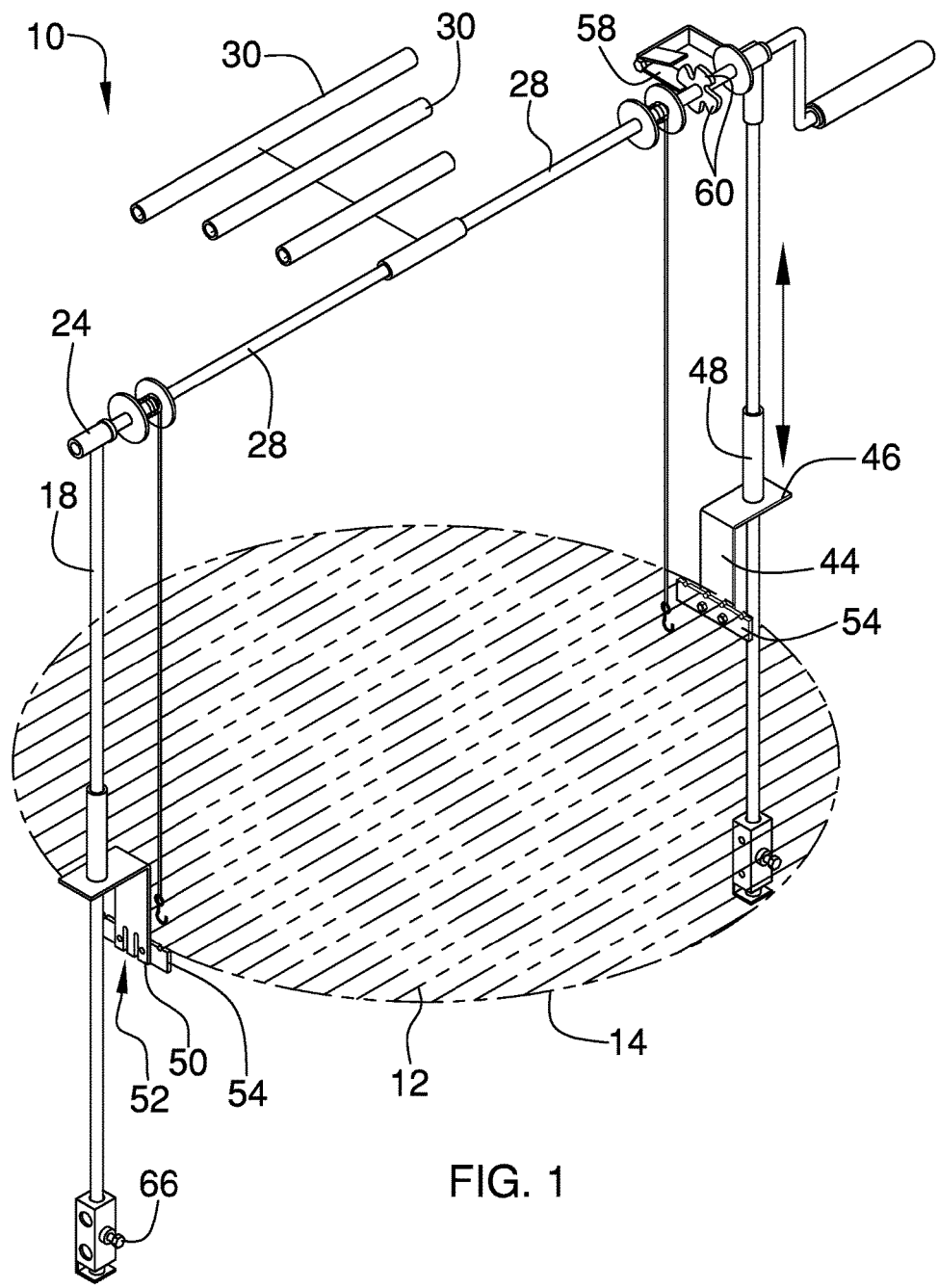
FIG. 1 is a top perspective view of an adjustable height grilling grate assembly according to an embodiment of the disclosure.
Figure 2:
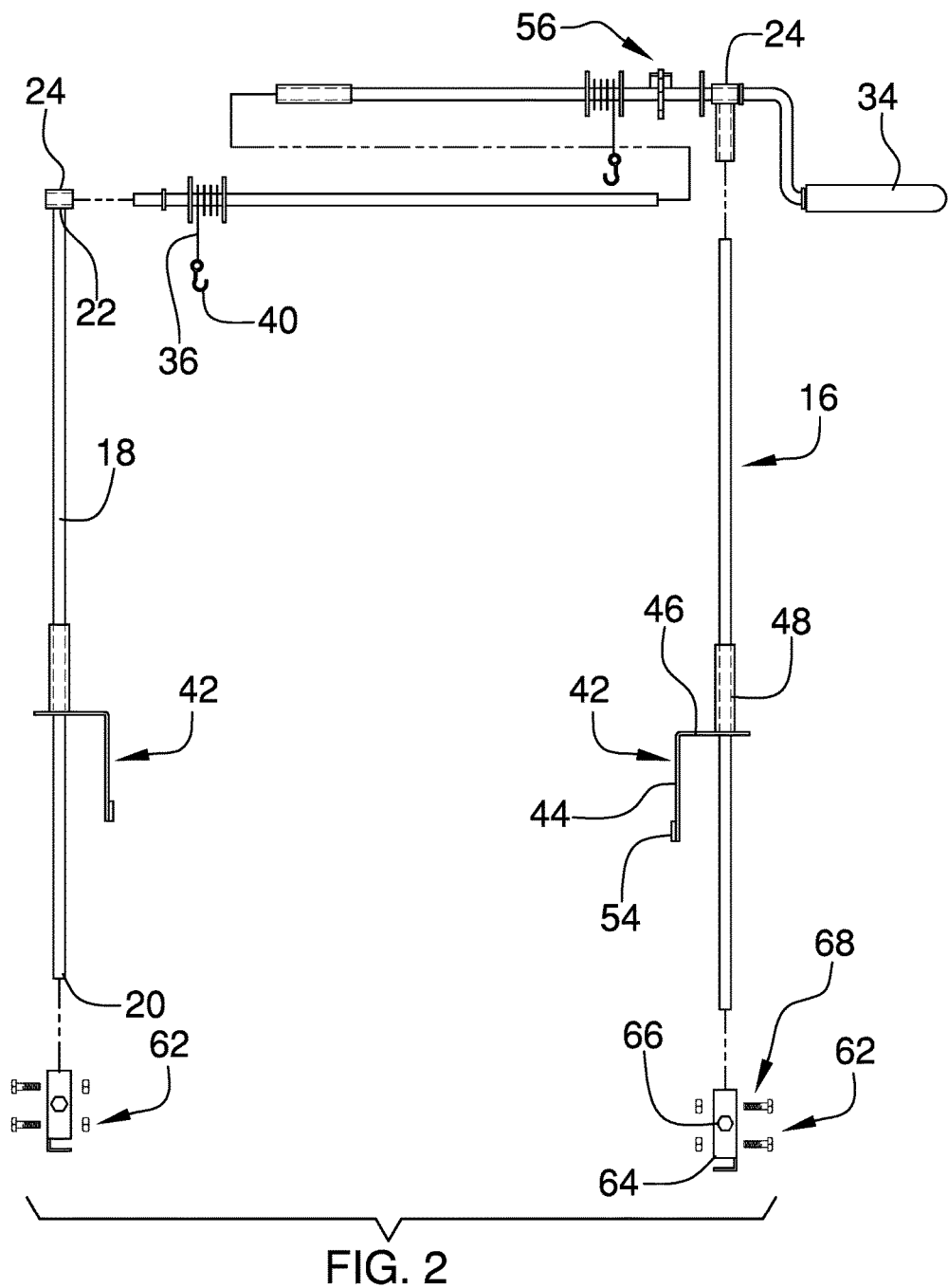
FIG. 2 is a side view of an embodiment of the disclosure.

With reference now to the drawings, and in particular to FIGS. 1 through 5 thereof, a new grate height adjustment device embodying the principles and concepts of an embodiment of the disclosure and generally designated by the reference numeral 10 will be described.

As best illustrated in FIGS. 1 through 5, the adjustable height grilling grate assembly 10 generally comprises a grate 12 having a perimeter edge 14. The grate 12 may be from a conventional grill or a grate used over an open fire. A lift 16 is attached to the grate 12 and is configured to lift or lower the grate 12. The lift 16 comprises a pair of vertical supports 18 each having a bottom end 20 and a top end 22. The top ends 22 may include bushings 24 for receiving a spindle 26 that is attached to and extends between each of the vertical supports 18. The spindle 26 is rotatable with respect to the vertical supports 18. The spindle 26 may not be a single continuous member but may include a pair of outer sections 28 and a plurality of removable inner sections 30. The inner sections 30 act as sleeves which receive and secure together the outer sections 28. Only one inner section 30 is used at a time and each of the inner sections 30 has a different length. In this manner, the overall length of the spindle 26 may be altered based upon the inner section 30 being used. This allows the assembly 10 to accommodate grates 12 of different dimensions. Instead of an inner section 30, the spindle 26 may be telescopic.

A handle 32 is attached to the spindle 26 and is actuated to rotate the spindle 26 in a selected direction. The handle 32 is positioned outside of the vertical supports 18 and may include a grip 34 that is rotatable with respect to a remaining portion of the handle 32. A pair of cables 36 is attached to and extends downwardly from the spindle 26. The cables 36 are wound onto the spindle 26 when the spindle 26 is rotated in a first direction and unwound from the spindle when the spindle 26 is rotated in a second direction. The cables 36 may be positioned on spools 38 mounted on the spindle 26 to prevent their movement along the spindle 26. A pair of connectors 40 is provided and each of the cables 36 terminates with one of the connectors 40. The connectors 40 may comprise hooks that are each attached to the grate 12.

Figure 3:
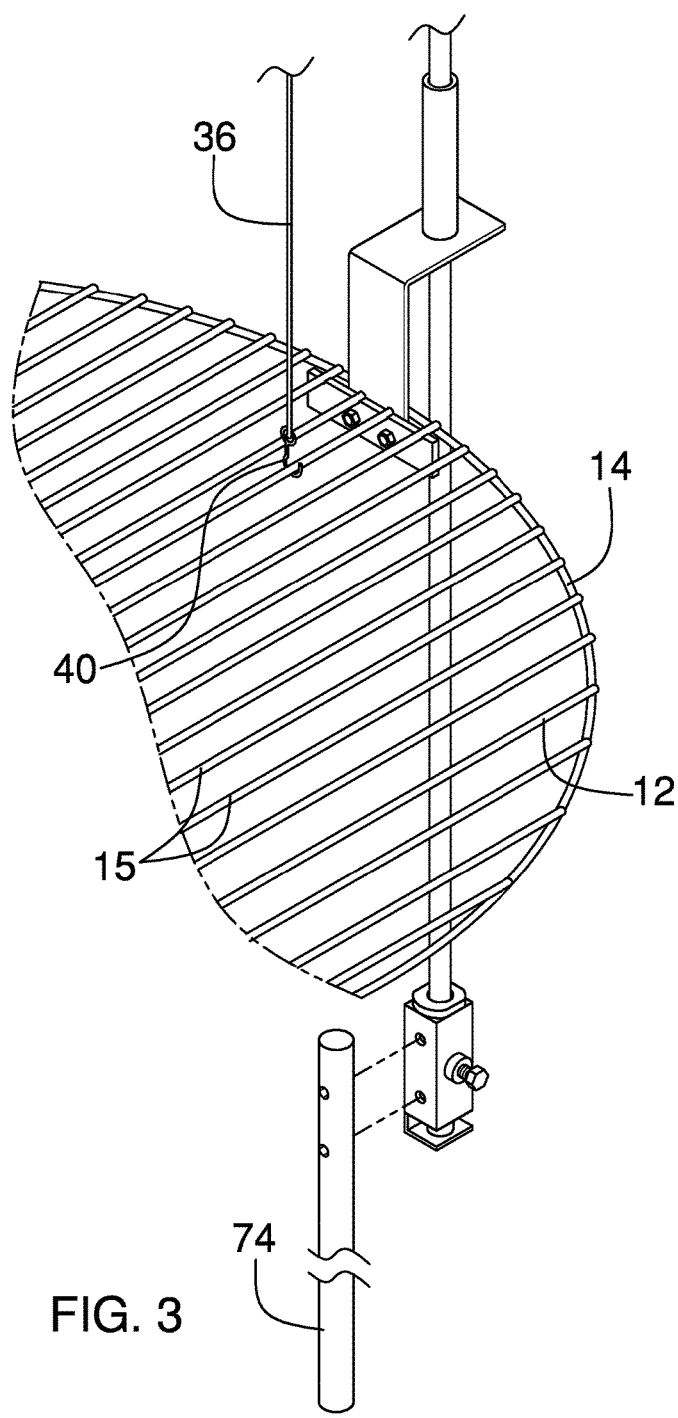
FIG. 3 is a broken perspective view of an embodiment of the disclosure.

A pair of couplers 42 is provided. Each the vertical supports 18 has one of the couplers 42 slidably mounted thereto so that the couplers 42 may slidably move upwardly or downwardly on an associated vertical support 18. Each of the couplers 42 engages the perimeter edge 14 of the grate 12 to retain the grate 12 in a horizontal orientation when the vertical supports 18 are in a vertical orientation. The couplers 42 may each comprise a vertical plate 44 and a horizontal plate 46 attached together. The vertical support 18 extends through the horizontal plate 46 and may further extend through a tube 48 mounted on the horizontal plate 46 to stabilize the orientation of the horizontal plate 46 relative to the vertical support 18 on which it is mounted. The vertical plate 44 has a bottom edge 50 having a plurality of notches 52 extending upwardly therein. Each notch 52 receives one of the rods 15 of the grate 12 as shown in FIGS. 1 and 3. A securing plate 54 is then attached to the vertical plate 44 below the grate 12 to retain the grate 12 in place. The securing plate 54 abuts the bottom of the grate 12 to further stabilize its horizontal orientation.

The lift 16 may further include a locking member 56 that is attached to one of the vertical supports 18. The locking member 16 restricts rotation of the spindle 26. The locking member 16 may include a flexible panel 58 attached to the one of the vertical supports 18 which engages a plurality of catches 60 radiating outwardly from the spindle 26. The flexible panel 58 prevents unwanted turning of the spindle 26 but the panel 58 may be overcome by turning the handle 32.

Figure 4:
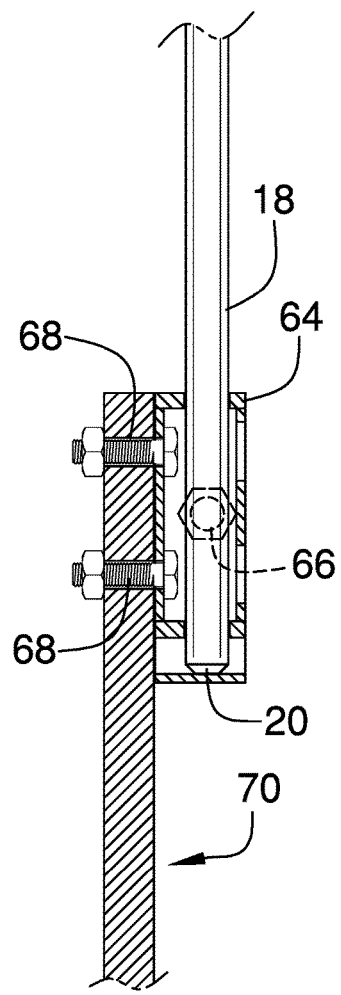
FIG. 4 is a cross-sectional view of an embodiment of the disclosure.
Figure 5:
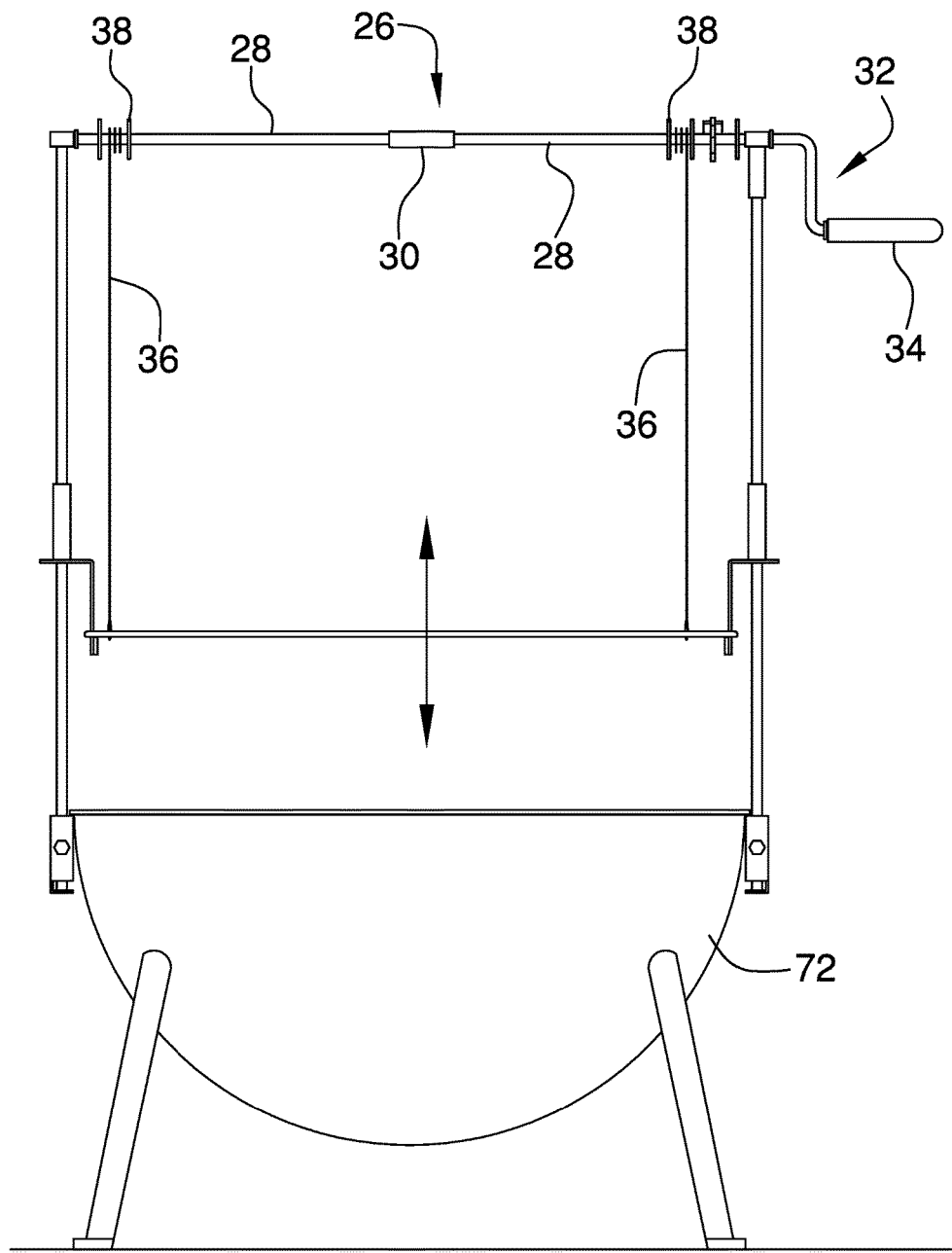
FIG. 5 is a side view of an embodiment of the disclosure.

A pair of mounting brackets 62 is provided and each of the bottom ends 20 of the vertical supports 18 has one of the mounting brackets 62 attached thereto. As can be seen in FIG. 4, the mounting brackets 62 may comprise a housing 64 for receiving the bottom ends 20 and a lower portion of the vertical supports 18. Set screws 66 are provided so that each housing 64 has least one set screw 66 which is used to retain the vertical support 18 within the housing 64. Each of the housings 64 includes fasteners 68 that are extended through their associated housings 64 and into a base 70. The base 70 may comprise any structure that retains the vertical supports 18 in a vertical orientation. However, two preferred bases 70 include a grill housing 72 as shown in FIG. 5 or stakes 74 as shown in FIG. 3. When used with a grill housing 72, the assembly 10 lifts the grate 12 to a selected height over the grill housing 72 to control the amount of heat received by the grate from charcoal, or other fuel, burning within the grill housing 72. When used with stakes 74, the stakes 74 will be driven into a ground surface and the grate 12 will typically be positioned over an open fire. The fasteners 68 typically extend through the base 70 as shown in FIG. 4 regardless of which base 70 is being used and may comprise bolts held in place with nuts.

In use, the assembly 10 allows for attachment of a lift 16 for a grate 12 to any base 70 so that the user of the assembly may lift and lower the grate 12 relative to the base 70 as needed. This allows movement of the grate 12 relative to the heat source below the grate 12 to control the amount of heat being applied to food positioned on the grate 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grilling grate supporting apparatus comprising:
a grate having a perimeter edge;
a lift being attached to said grate and being configured to lift or lower said grate, said lift comprising:
a pair of vertical supports each having a bottom end and a top end;
a spindle being attached to and extending between each of said vertical supports, said spindle being rotatable with respect to said vertical supports, said spindle including a pair of outer sections and a plurality of removable inner sections, wherein one of said inner sections receives and secures together said outer sections, each of said inner sections having a different length;
a handle being attached to said spindle and being actuated to rotated said spindle in a selected direction;
a pair of cables being attached to and extending downwardly from said spindle, said cables being wound onto said spindle when said spindle is rotated in a first direction and unwound from said spindle when said spindle is rotated in a second direction;
a pair of connectors, each of said cables terminating with one of said connectors, each of said connectors being attached to said grate;
a pair of couplers, each said vertical supports having one of said couplers slidably mounted thereto, each of said couplers engaging said perimeter edge of said grate to retain said grate in a horizontal orientation when said vertical supports are in a vertical orientation, each of said couplers comprising a vertical plate attached to a horizontal plate, said vertical support slidably mounted to said coupler extending through said horizontal plate and through a tube coupled to and extending upwardly from said horizontal plate, a plurality of spaced notches extending into said vertical plate wherein said vertical plate is positionable to have respective rods of said grate in said notches, and a securing plate being coupled to said vertical plate such that said securing plate is positioned under and abuts said grate to secure said respective rods in said notches;
a locking member being attached to one of said vertical supports, said locking member restricting rotation of said;
a pair of mounting brackets, each of said bottom ends of said vertical supports having one of said mounting brackets attached thereto; and a base being attached to said mounting brackets, said base retaining said vertical supports in a vertical orientation.

* * * * *